United States Patent [19]
Waldman

[11] 3,935,389
[45] Jan. 27, 1976

[54] METHOD AND APPARATUS FOR AUTOMATICALLY LIMITING REWIND IN A TELEPHONE ANSWERING MACHINE

[75] Inventor: Herbert Waldman, Brooklyn, N.Y.

[73] Assignee: Quasar Microsystems, Inc., Brentwood, N.Y.

[22] Filed: Feb. 2, 1973

[21] Appl. No.: 328,900

[52] U.S. Cl............................................. 179/6 E
[51] Int. Cl.[2].................... H04M 1/64; G11B 15/20
[58] Field of Search........... 179/6 R, 6 E, 100.1 DR

[56] References Cited
UNITED STATES PATENTS

| | | | |
|---|---|---|---|
| 3,133,992 | 5/1964 | Dickman................... | 179/100.1 DR |
| 3,226,478 | 12/1965 | Martin et al........................ | 179/6 R |
| 3,288,941 | 11/1966 | Langendorf............... | 179/100.1 DR |
| 3,337,690 | 8/1967 | Martin ............................... | 179/6 R |
| 3,524,936 | 8/1970 | Hill.................................... | 179/6 E |
| 3,527,312 | 9/1970 | Dooley...................... | 179/100.1 DR |
| 3,569,630 | 3/1971 | Parks et al. ......................... | 179/6 E |
| 3,673,332 | 6/1972 | Muller et al........................ | 179/6 E |

Primary Examiner—Stanley M. Urynowicz, Jr.
Attorney, Agent, or Firm—Friedman & Goodman, Esqs.

[57] ABSTRACT

A telephone answering apparatus has a forward drive time delay relay which causes a tape bearing a series of messages to advance for approximately 30 seconds subsequent to the reproduction of the last message in the series. The forward drive time delay relay cooperates with a recording amplifier so as to prevent recording of information on the advanced portion of the tape. The relay also cooperates with an erase circuit to cause recorded information on the advanced portion of tape to be erased to thereby create a no-signal or silent portions of tape. The advanced portions of the tape are detectable by a no-signal detector during rewind of the tape which automatically stops rewind when a no-signal portion is detected. A method is disclosed for generating silent portions on a tape and for automatically stopping rewind in a telephone answering apparatus at points, prior to complete rewind, where the no-signal portions are detected.

6 Claims, 3 Drawing Figures

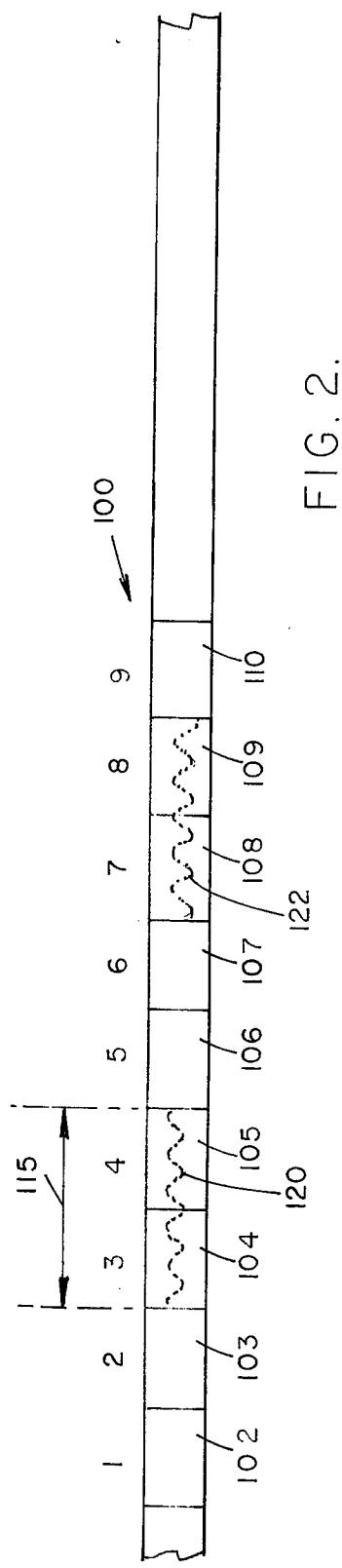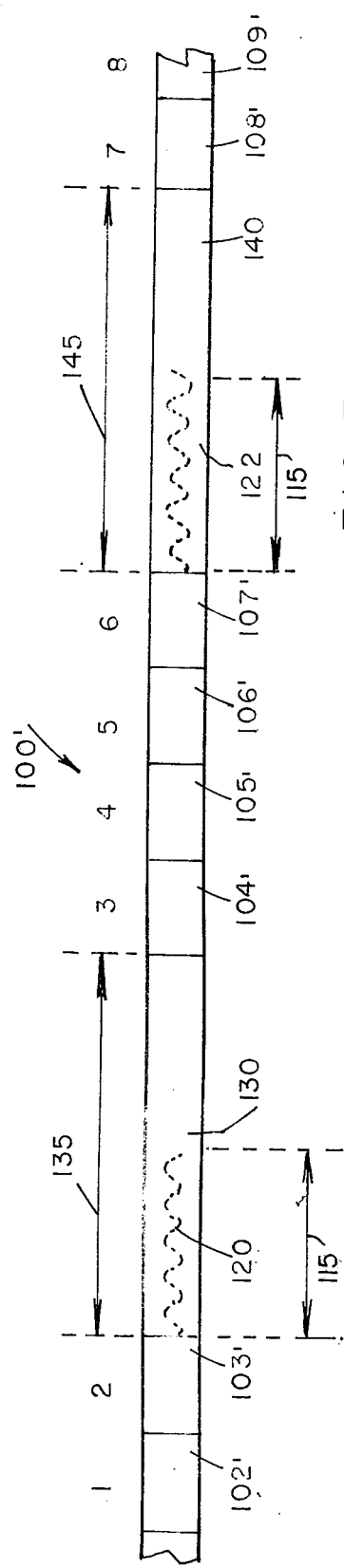

3,935,389

METHOD AND APPARATUS FOR AUTOMATICALLY LIMITING REWIND IN A TELEPHONE ANSWERING MACHINE

BACKGROUND OF THE INVENTION

The present invention relates to an automatic telephone answering apparatus which has provision for playing back the recorded messages transmitted over the telephone lines in response to receipt of a coded signal over the telephone lines, and in particular to an automatic telephone answering apparatus in which only the series of messages between successive coded signals transmitted over the telephone lines are selectively played back.

In telephone answering apparatus of the prior art, the ringing of the telephone at the subscriber's station initiates a normal answering cycle during which a prerecorded message is first reproduced over the telephone line, and thereafter a recording device is actuated so as to receive a message over the telephone line. In addition, such a prior art device has provision for playing back previously recorded messages over the telephone line in response to a coded signal initiated by the subscriber from a point remote from his telephone station. Telephone answering apparatus is already known which prevents the machine from continuously playing back until all the recording tape is used up. An apparatus which has means for terminating the play-back of the recorded messages is described in U.S. Pat. No. 3,508,004.

However, prior art telephone answering apparatus have had the disadvantage that each time a coded signal is received over the telephone lines, the apparatus rewinds the entire tape to the beginning thereof prior to play-back. Consequently, the user who transmits the coded signal must listen to all the recorded messages on the entire initial portion of the tape. However, this is a time consuming inconvenience, especially when the user has called in one or two times previously. In such a case, the user must hear both the more recent messages as well as those which he has heard earlier when he previously called in.

SUMMARY OF THE INVENTION

Accordingly, it is an object of the present invention to provide a telephone answering apparatus which is not possessed of the above disadvantages associated with comparable prior art apparatus.

It is another object of the present invention to provide an automatic telephone answering apparatus which is simple in construction and economical to manufacture.

It is still another object of the present invention to provide an automatic answering apparatus as described above which advances the tape after the last recorded message is played back.

It is yet another object of the invention to provide an answering apparatus of the type under discussion which forms detectable tape portions after the last recorded message is played back which are detectable during rewind of the tape to stop rewind when such a tape portion is detected.

It is a further object, with respect to the last mentioned object, to make the detectable tape portions silent tape portions.

It is still a further object of the present invention to provide an automatic telephone answering apparatus as above described which only plays back, in response to a remotely transmitted coded signal over the telephone lines, those messages which have been recorded since the last coded signal was transmitted by the user.

It is yet a further object of the present invention to provide an automatic telephone answering apparatus which does not rewind the entire tape when a remotely transmitted coded signal is transmitted over the telephone lines for the purpose of playing back a most recent series of recorded telephone messages.

It is an additional object of the present invention to provide a method for generating detectable portions on a tape at the end of a series of messages which are detectable during rewind of a telephone answering apparatus.

It is still an additional object, in connection with the last-mentioned object, to provide a method to stop rewind when a detectable portion is detected during rewind of a telephone answering apparatus.

In order to achieve the above objects, as well as others which will become obvious hereafter, the apparatus in accordance with the present invention is utilized in association with a telephone answering apparatus coupled to telephone lines having recording means for recording a series of messages on a tape. The recording apparatus also includes rewind means for rewinding the tape, and play-back means for reproducing the series of messages subsequent to rewinding of at least a portion of the tape bearing the messages. According to the present invention, advancing means are incorporated in the telephone answering apparatus for advancing the tape a predetermined distance starting substantially within the region of the trailing portion of the last message in the series.

According to a presently preferred embodiment conditioning means are provided for conditioning the advanced portion of the tape to thereby make said portion detectable during rewinding of the tape. Said conditioning means can conveniently comprise erasing means for erasing information recorded on said advanced portion and generating a silent tape portion. Detecting means are provided for detecting the conditioned portions of the tape during rewinding of the latter and for terminating further rewinding of the tape in response to detection of the conditioned portion of the tape.

According to the presently preferred embodiment, said advancing means includes a forward drive means for advancing the tape. Also, forward time-delay means cooperate with the forward drive means forr energizing the latter for a time period corresponding to said predetermined distance.

The method in accordance with the present invention, wherein a series of messages are recorded on a tape, comprises the step of advancing the tape a predetermined distance starting substantially within the region of the trailing portion of the last message in the series. According to a presently preferred embodiment, the method includes the further step of conditioning the advanced portion of the tape to thereby make that portion detectable during rewinding of the tape. Said conditioning step advantageously comprises of the step of erasing the advanced tape portion. The method preferably further comprises the step of detecting the conditioned portions of the tape during rewinding of the latter to thereby terminate further rewinding of the tape.

BRIEF DESCRIPTION OF THE DRAWINGS

With the above and additional objects and advantages in view, as will hereinafter appear, this invention comprises the devices, combinations and arrangements of parts hereinafter described and illustrated in the accompanying drawings of a preferred embodiment in which:

FIG. 2 is a schematic representation of a tape recorded on a prior art automatic telephone answering apparatus, showing the arrangements of successive messages; and FIG. 3 is a view similar to that shown in FIG. 2, showing the arrangement of messages in accordance with the present invention.

DETAILED DESCRIPTION OF THE PREFERRED EMBODIMENTS

Figure 1:
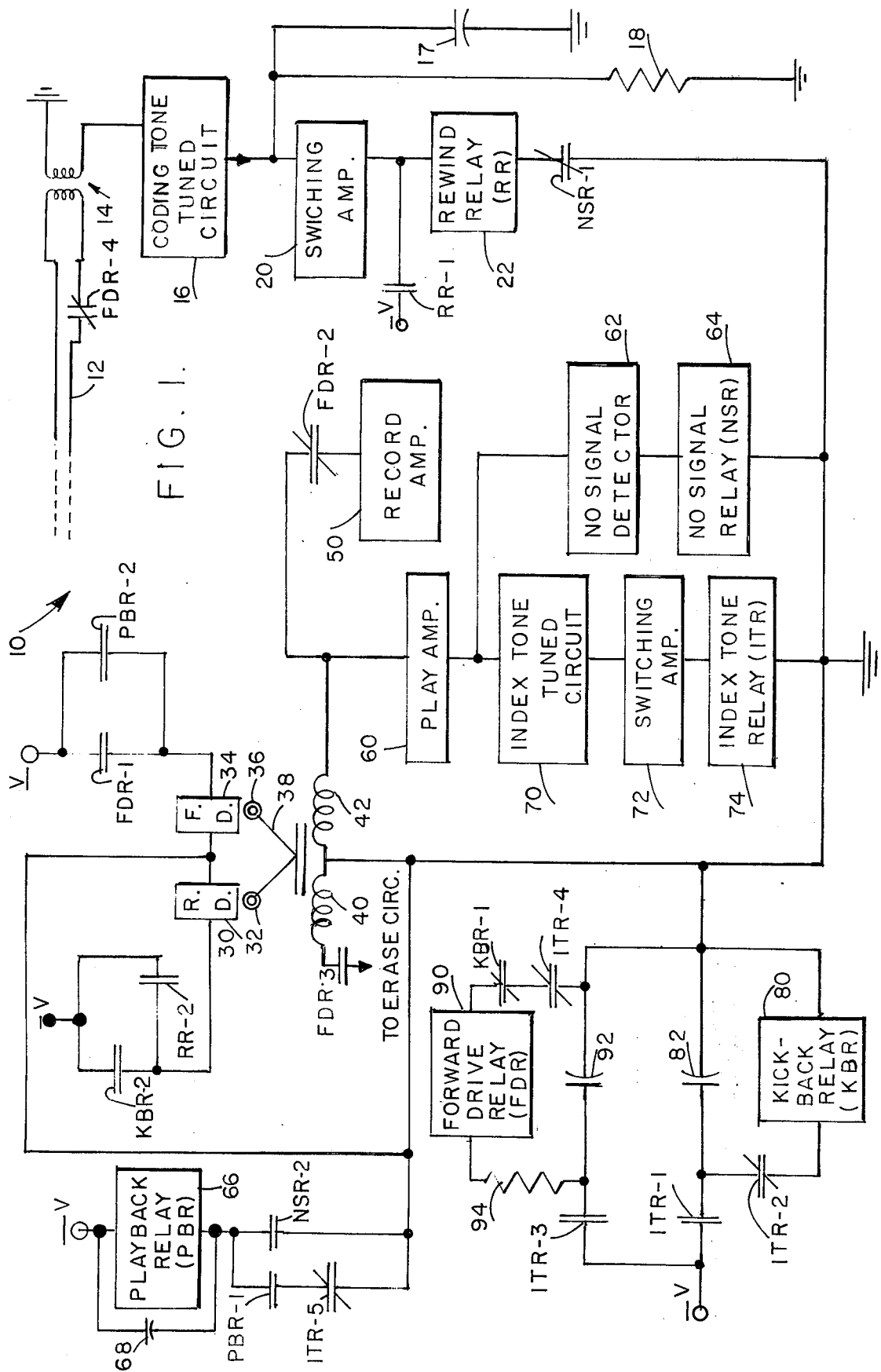
FIG. 1 is a partial schematic of an automatic telephone answering apparatus with remote play back and incorporating the rewind limiting means in accordance with the present invention.

A telephone answering apparatus pursuant to the present invention is based upon telephone answering and recording apparatus of conventional design and well known in the prior art. Consequently, only those portions of such prior art apparatus which are necessary for understanding the present invention are illustrated and described. Various components of the answering apparatus pursuant to the present invention, such as the ringing response and actuating means, and so on, are each well known in the prior art, and are fully illustrated and described in the U.S. Pat. Nos. 3,127,474; 3,501,592 and 3,508,004.

FIG. 1 utilizes the detached contact type of notation. In this form of notation, the normal unoperated condition of relay contacts is designated by "||" if open (make contact) and by ⫫ if closed (brake contacts). The foregoing type of notation is illustrated and described in detail in an article entitled "An Improved Detached Contact Type of Circuit Drawing", by F. T. Meyer, appearing in the A.I.E.E. Transactions, for September 1955, Volume 74, Pages 505–513.

In FIG. 1, the telephone answering apparatus is generally designated by reference numeral 10 and is shown to be direct coupled to telephone lines 12 by means of a coupling transformer 14 through a normally closed switch FDR-4, whose function will be described hereafter. However, for the purposes of the present invention, it is not critical whether the telephone answering apparatus is direct coupled or coupled acoustically, inductively or in any other fashion to the telephone lines. Connected to the coupling transformer 14 is a coding tone tuned circuit 16. The tuned circuit 16 may be in the form of a filter which permits the passage of the coded signals transmitted over the telephone lines 12 by a user who wishes to commence a normal answering cycle during which pre-recorded messages are reproduced over the telephone lines. The main function of the tuned circuit 16 is to selectively pass only the coded signals while preventing the passage of other signals which may appear on the telephone lines 12, including voice signals. In this manner, it is insured that the answering apparatus is only triggered by coded signals and is not falsely triggered by other spurious signals.

The tuned circuit 16 is connected to a switching amplifier 20. A timing circuit, comprising a capacitor 17 and a resistor 18 is connected at the input of the switching amplifier 20 — the timing circuit preventing an instantaneous rise in potential at the input to the switching amplifier 20 on the initial appearance of a coded signal. The switching amplifier 20 may be of any conventionally known design. Advantageously, the switching amplifier 20 switches states when the D.C. level at its input rises to a predetermined level. For example, D.C. switching amplifiers, Schmitt triggers as well as flip-flops can be utilized as switching amplifiers.

The output of the switching amplifier 20 is connected to a rewind relay 22 at one terminal, the other terminal of the rewind relay being connected to a circuit ground through a normally closed switch NSR-1.

Subsequent to a brief time delay, determined by the time constant of the capacitor 17 and the resistor 18, the switching amplifier is caused to switch states to thereby energize the rewind relay 22, which may comprise a relay coil. A normally open switch RR-1, forming part of the rewind relay 22, is connected between a negative potential −V and the ungrounded side of the rewind relay. The switch RR-1 serves to latch the rewind relay 22 once it is energized. Thus, when the rewind relay 22 is energized, switch RR-1 closes and the negative potential −V is applied directly across the rewind relay 22. So long as the switch NSR-1 remains closed, the rewind relay 22 remains energized.

The telephone answering apparatus includes recording means, rewind means and play-back means all conventional and known in the prior art. A full description of these standard means are described in U.S. Pat. No. 3,508,004. However, the portions of these means which are directly pertinent for the purposes of the present invention will now be described.

A rewind drive means 30 is provided which cooperates with a tape spool 32 and conventionally comprises a motor. However, any other drive means may be utilized. When the rewind drive means 30 is energized, the tape spool 32 is caused to turn in one direction which causes the tape 38 to rewind onto the spool 32.

Similarly, a forward drive means 34 is provided which cooperates with a tape spool 36. When the forward drive means is energized, the tape 38 is caused to move in the other direction so as to wind the tape about the spool 36.

A portion of the exposed tape 38, which is not wound on either of the spools, is caused to pass a region where an erase head 40 and a play and record head 42 are positioned. As well known to those skilled in the art, messages may be recorded on the tape 38 while the latter is moving in the forward direction by transmitting suitable signals through the head 42. Also, when the tape 38 moves in a forward direction, information recorded on the tape may be played back by sensing the recorded signals on the tape 38 by the head 42. When it is desired to erase information which is recorded on the tape 38, a suitable signal may be transmitted to the erase head 40 while the tape is moving past the latter. All the just described procedures and steps are well known to the art and need not be further elaborated in the present application.

A recording amplifier 50 is connected to the play or recording head 42 through a normally closed switch FDR-2. Thus, when the switch FDR-2 is closed and the forward drive means 34 is energized, signals are applied to the recording head 42 to thereby record signals on the tape 38 — the signals being fed into the recording amplifier by conventional means (not shown). It should be noted at this point, although further elaboration will follow hereafter, that even when recording information is not fed into the recording amplifier by, for example, a microphone, noise signals which appear at the input of the amplifier are nevertheless amplified and appear at the recording head 42. Thus, even when no recording signals are impressed on the recording amplifier 50, it is still possible for stray signals, such as noise and miscellaneous pickup signals, to be recorded on the tape 38.

Also connected to the recording and play head 42 is a play amplifier 60 which is adapted to receive the weak signals which are generated in the play head 42 when the tape 38 passes in the region thereof and amplify the same. For the purposes of the present invention, the play-head 42 is preferably arranged to pick up signals from tape 38 both during forward as well as reverse or rewind movement. It is common in the art to select the reverse and forward driving means 30, 34, respectively, so that the tape 38 rewinds at a much faster rate than it moves forward. However, the range at which the tape 38 moves in one direction or the other does not prevent the play-head 42 from picking up signals associated with recorded information on the tape. The play amplifier 60 amplifies both the signals induced in the play-head 42 during forward as well as rewinding movement.

Connected to the output of the play amplifier 60 is a no-signal detector 62. The no-signal detector 62 is adapted to detect a no-signal condition on the tape 38. Such detectors are already known to the art. One such detector is described in U.S. Pat. No. 3,665,117. The purpose of the no-signal detector 62 will be described hereafter. However, when the no-signal detector 62 detects a no-signal condition on the tape 38, it is adapted to energize a no-signal relay 64. It should be noted, that normally closed switch NSR-1 forms part of the no-signal relay 64 and opens only upon the energization of the latter.

A play-back relay 66, which may be in the form of a relay coil, is connected between a negative potential −V to the circuit ground through a network of switches. The play-back relay 66 is connected to ground firstly through a normally opened switch NSR-2. The play-back relay 66 is also connected to the circuit ground through another parallel switch circuit comprising series connected normally opened switch PBR-1 and normally closed switch ITR-5. A capacitor 68 is connected in parallel with the play-back relay 66 to prevent instantaneous changes in potential across the relay. The normally opened switch PBR-1 forms a part of the play-back relay 66 and closes only when the latter is energized. A normally opened switch PBR-2, forming part of the relay 66, is interposed between the negative potential −V to the forward drive means 34. A normally opened switch RR-2 is interposed between the negative potential −V and the reverse drive means 30. The switch RR-2 is associated or forms a part of the rewind relay 22.

It is contemplated that the present invention may be utilized with an automatic telephone answering apparatus with remote control play-back means which records an index tone on the tape when a coded signal is transmitted over the telephone lines by a user wishing to play-back recorded messages. Such an automatic telephone answering apparatus is more fully described in U.S. Pat. No. 3,508,004. The manner of recording the index tones will be more fully described hereafter. However, when a recorded index tone appears on the tape 38, the amplified index tone is transmitted through the play amplifier 60 to an index tone tuned circuit 70. The index tone tuned circuit 70 may be similar in construction to the coding tone tuned circuit 16. Both tuned circuits serve the same function of passing the selected tones while preventing the passage of signals other than the selected tones. Similarly to the coding tone tuned circuit 16, the tuned circuit 70 has its output connected to a switching amplifier 72 for controlling an index tone relay 74.

To summarize, the circuitry connected to the play and record head 42 operates to energize a no-signal relay 64 when a no-signal appears on the tape 38 while the latter is moved in the forward or reverse mode, while energizing the index tone relay 74 when an index tone is recorded on the tape 38 and detected by the record and play head 42.

The switch NSR-2 forms a part of the no-signal relay 64 and closes only when the latter is energized. The normally closed switch ITR-5 forms a part of the index tone relay 74 and opens only when the latter is energized.

The present invention will now be described in connection with an automatic telephone answering apparatus which includes means for eliminating recorded index tones which are recorded at the end of the last message in a series. The means for accomplishing this function is provided by a kick-back relay 80 in conjunction with a capacitor 82. The ungrounded terminal of the capacitor 82 is connected to a negative potential −V through a normally open switch ITR-1. The latter switch forms part of the index tone relay 74 and closes only when the latter is energized. The kick-back relay 80 is connected in parallel across the capacitor 82 through a normally closed switch ITR-2. The latter switch forms part of the index tone relay 74 and opens only when the latter is energized. The kick-back relay 80 has a normally open kick-back relay switch KBR-2 which is interposed between a source negative potential −V and the reverse drive means 30. The circuitry associated with the kick-back circuit is described in great detail in U.S. Pat. No. 3,508,004.

An important and novel feature of the present invention consists in the provision of a forward drive relay 90, which may be in the form of a relay coil. The forward drive relay 90 is connected in series with a resistor 94 and a normally closed switch KBR-1 and normally closed switch ITR-4. The switch KBR-1 forms a part of the kick-back relay 80 and opens only when the latter is energized. The normally closed switch ITR-4 forms part of the index tone relay 74 and opens only when the latter is energized. The forward drive relay 90, and its associated series connected elements are all connected in parallel with a capacitor 92. The parallel combination is connected at one side to the circuit ground while the other side is connected to a negative potential through a normally open switch ITR-3. The switch ITR-3 forms part of the index tone relay 74 and closes only when the latter is energized.

In order to facilitate a description of the operation of the circuit shown in FIG. 1, reference is first made to FIG. 2 wherein a tape 100 is shown to have recorded thereon a series of nine sequential messages respectively designated by the reference numerals 102-110. The tape 100 schematically illustrates the positions of the various messages recorded on appropriate telephone answering apparatus with remote tape play-back of the type described in U.S. Pat. No. 3,508,004. The first two messages 102–103 form a first series or, more accurately, a sub-series of messages. Messages 3–6 designated by reference numerals 104–107 represent a second sub-series of messages, while the messages 7–9, designated by reference numerals 108–110, designate a third sub-series of messages. With the prior art answering apparatus, for example, if a user transmits a coded signal on the telephone lines to play-back the recorded messages subsequent to the second message 103, the coded signal is recorded as index tone signal 120 on the tape prior to the rewinding of the same to the beginning of the first message 102. After total rewind, the first two messages are played back. The tape continues to play-back for a period corresponding to a distance 115 — this being equal to the portion of tape on which the signal 120 is recorded — corresponding to approximately 2–3 seconds of recording time. In the region of the end of the signal 120, kick-back or retracting means including relay means comparable to kick-back relay 80 is effective to cause the rewind drive means to rewind the tape a distance of approximately equal to the distance 115 so as to bring the record and erase heads in the region of the end of the second message 103. At this time, the answering machine stops movement of the tape and remains in a stand-by mode awaiting further messages to be transmitted over the telephone lines which are to be recorded. When the third message 104 is received by the answering machine, this message 104 commences in the region of the end of the second message 103 and is recorded in a conventional manner by the record amplifier 50. Simultaneously, the previously recorded message and the index tone 120 are erased by the erase head 40 in cooperation with the erase circuit (not shown) in a manner well known to those skilled in the art. For this reason, the signal 120 is fully erased. However, the distance 115 has been arbitrarily selected to correspond to the length of the third and fourth messages. This is not critical and the tone 120 need not be related in any manner to the length or duration of the recorded messages. The third through the sixth message 104–107 in the second series are next sequentially recorded until the user of the answering device again transmits a coded signal on the telephone lines. The coded signal is recorded as a signal tone and designated by the reference numeral 122. Simultaneously, the rewinding means, responding to the transmitted tone, causes the tape to rewind to the beginning of the first message and commence play-back. It is clear, that the user must again listen to the messages in the first sub-series — namely the first and second messages 102, 103 — even though he has already heard the same. At the end of the play-back of the sixth message 107, the signal tone 122 is retraced, as described above, so that the record and erase heads are positioned in the region of the end of the sixth message 107. As before, the transmission of the third sub-series of messages — namely the seventh through ninth (7–9) messages – simultaneously records the new messages while erasing the signal tone 122. Insofar as the answering apparatus is concerned, the tape consists of a series of messages 1–9 which are effectively sequentially recorded. There is no information contained on the tape which shows the points defining the ends of previous sub-series and which could prevent rewinding of the tape each time to the beginning so that the user need not repeatedly listen to the same messages which belong to previous sub-series as defined or separated by the user's transmitted signal code.

It is clear, however, that a user normally does not want to hear over and over again the messages which belong to previous sub-series recorded prior to previously transmitted coded signals on the telephone lines.

The operation of the circuit shown in FIG. 1, will now be described in connection with FIG. 3. A tape 100' is shown to have two messages respectively designated by the reference numerals 102, 103. The means for recording the voice messages on the tape 100' are conventional and are not shown in FIG. 1. It will now be assumed that a user transmits a coded signal on the telephone lines 12 for the purpose of playing back the messages recorded on the tape 100'. The coded signal is coupled through the normally closed switch FDR-4 and through the transformer 14 to the coding tone tuned circuit 16. The tuned circuit 16 passes the index tone and the latter appears at the output of the tuned circuit 16. As with the prior art apparatus, the index tone is recorded on a portion of a tape designated by the reference numeral 115. The length of the portion is a function of the time constant of the capacitor 17 and the resistor 18. The time during which the coding tone is recorded may conveniently be selected to be equal to 2–3 seconds. The latter time interval is not critical for the purposes of the present invention and any other time interval, consistent with detectability of the coding and index tone, may be utilized. Also, it should be pointed out that the index tone signals 120 are not shown to scale and the length of the recorded index tone signal may be a smaller or greater than that of each of the messages. Also, all the messages have been shown to be equal in length. This has only been shown in this manner for purposes of convenience and simplicity — the different messages being capable of having different time durations.

The switching amplifier 20 does not cause the rewind relay to be energized immediately upon the appearance of a coding tone as a result of the timing circuit comprising the capacitor 17 at the resistor 18. However, after the capacitor 17 has charged sufficiently, the switching amplifier 20 changes states and energizes the rewind relay 22. As soon as the rewind relay becomes energized through a normally closed switch NSR-1, the normally opened switch RR-1 simultaneously closes and the rewind relay 22 becomes latched as a result of the negative potential applied directly thereacross.

When the rewind relay 22 closes, normally opened contacts RR-2 close — this placing a negative potential −V directly across the rewind drive means 30. This commences the rewind cycle and the tape 38 is caused to move back to the beginning of the tape — here assumed to be the beginning of message number 1. Conventional means may be utilized at the beginning of the tape to stop the rewind operation and commence play-back. This involves circuitry (not shown) which unlatches the energized rewind relay 22 and energizes the play-back relay 66.

When the play-back relay 66 is energized, the normally opened switch PBR-1 closes and the play-back relay 66 becomes latched by having a negative potential −V placed thereacross through normally closed switch ITR-5. It should be pointed out, at this time, that the application of the potential −V across the relay 66 causes a capacitor 68 to charge to the potential −V.

The normally opened switch PBR-2, forming a part of the play-back relay 66, closes upon the energization of the latter and causes a potential −V to be applied across the forward drive means 34. Consequently, the tape 38 starts to move forward and the first two messages are picked up by the play head 42 and played back through the play amplifier 60. The answering apparatus continues to play back the tape 38 until the recorded index tone 120 appears at the play head 42. At such time, the recorded index tone 120 is passed through the index tone tuned circuit 70 — this causing the switching amplifier 72 to energize the index tone relay 74.

Upon the energization of the index tone relay 74, a series of simultaneous events occur. Firstly, normally closed switch ITR-5 opens and causes the latched playback relay 66 to become deenergized by opening its ground connection. However, because of the charge on the capacitor 68, the play-back relay 66 remains energized for a time determined by the time constant of the capacitor 68 and the play-back relay 66 coil. In essence, the capacitor 68 discharges through the play-back relay 66 for a predetermined time subsequent to the initial detection of the index tone by the switching amplifier 72. The time constant of the play-back relay circuit, including the capacitor 68, is so selected so that play-back continues for a time which permits the tape to move forward a distance approximately corresponding to the distance 115. Once the play head 42 is disposed opposite the end of the portion 115, the capacitor 68 is discharged and the play-back relay 66 becomes deenergized.

The deenergization of the play back relay 66 causes the normally open switches PBR-1 and PBR-2 to re-open. The reopening of the switch PBR-2 removes the potential −V placed across the forward drive means 34 to thereby deenergize the same. Accordingly, the tape drive stops and the tape 38 no longer moves forward.

When the index tone relay 74 is energized, normally open switches ITR-1 and ITR-3 close. Simultaneously, normally closed switches ITR-2 and ITR-4 open. The opening of ITR-2 and ITR-4 opens the respective circuits of the kick-back relay 80 and of the forward drive relay 90. With ITR-1 closed, the capacitor 82 has a potential −V applied thereacross and this capacitor charges for the duration of time during which the index tone relay is energized. Similarly, for the time that the index tone relay 74 is energized, the switch ITR-3 is closed — this placing a potential −V across the capacitor 92 to thereby charge the latter. The duration of time for which the index tone relay 74 is energized is determined by the time during which the play head 42 picks up the tone 120 on the tape 100′. As described earlier, the play-back amplifier 60 continues to receive the index tone from the play head 42 so long as the play-back relay 66 remains energized — this being a function of the size of the capacitor 68 which discharges through the play-back relay 66. Accordingly, the value of the capacitor 68 is selected to insure that the play-back relay, and therefore switch PBR-2, remain activated for a time sufficient to charge capacitors 82 and 92 to a predetermined desired value. As soon as the capacitor 68 is sufficiently discharged so as to release the play-back relay 66, or as soon as the entire tone 120 has been played back, whichever occurs earlier, this causes the index tone relay to become deenergized.

When the index tone relay 74 becomes deenergized, switches ITR-2 and ITR-4 again close or return to their normal state. As soon as this occurs, the capacitor 82 is placed directly across the kick-back relay 80 through the now closed switch ITR-2 and the kick-back relay 800 is energized for a time which is a function of the amount of charge stored in the capacitor 82. When the capacitor 82 discharges through the kick-back relay 80, normally closed switch KBR-1 opens and normally opened switch KBR-2 closes. The opening of the switch KBR-1 retains the circuit of the forward drive relay 90 open so that the now charged capacitor 92 cannot discharge as yet through the forward drive relay 90. an The closing, however, of the switch KBR-2 places the potential −V across the reverse drive means 30 to thereby cause a rewinding of the tape 38 for a time which is substantially equal to the time the kick-back relay 80 is energized. Accordingly, the size of the capacitor 82, as well as the time during which it is charged, is so controlled so that the time during which the kick-back relay 80 is energized due to the discharging of the capacitor 82 corresponds to a rewind distance approximately equal to portion distance 115. Thus, subsequent to the playing of the index tone 120, the reverse drive means is kicked back or retraces the index tone portion 115.

When the capacitor 82 has discharged sufficiently to permit the kick-back relay 80 to again become deenergized, two events occur simultaneously. Firstly, the normally closed switch KBR-1 closes again — this closing the circuit of the forward drive relay 90. Now, the capacitor 92 is permitted to discharge through the forward drive relay 90 by way of a resistor 94. Secondly, the normally open switch KBR-2 opens again — this removing the potential −V from across the reverse drive means 30 to thereby stop further rewinding of the tape 38. At this time, the erase and recording heads 40, 42, respectively, are approximately positioned or disposed near the region of the beginning of the index tone 120.

When the capacitor 92 discharges through the forward drive relay 90, the latter becomes energized for a period of time which is substantially determined by the time constant defined by the capacitor 92 and the resistor 94 as well as the resistance of the forward drive relay. When the forward drive relay 90 is energized, the normally open switch FDR-1 closes — this placing a negative −V potential across the forward drive means 34. This initiates the forward means 34 and causes the tape 38 to move in the forward mode. Simultaneously, the normally closed switch FDR-2 opens to thereby isolate the record amplifier 50 from the recording head 42. This insures that no signals, impressed or noise, are recorded on the tape 38 while the forward drive relay 90 is energized. Also, simultaneously, the normally open switch FDR-3 closes — this connecting the erase head 40 to the erase circuit (not shown). This step is taken so as to insure that any recorded material on the tape 38 which passes the heads 40–42 during the time that the forward drive relay 90 is energized is erased. In addition to erasing previously recorded information, the index tone 120 is similarly erased. Lastly, energization of the forward drive relay opens the normally closed switch FDR-4 — this opening or releasing the telephone lines from the answering machine. The dropping or releasing of the telephone lines at the beginning of the formation of a silent portion serves two functions. Firstly, opening the switch FDR-4 frees the telephone lines — this being especially important where the forward drive relay is energized for a long period of time, as when very rapid rewind speeds are used. Secondly, opening the switch FDR-4 prevents telephone line noise from being coupled into the answering machine and being recorded on the tape during formation of the silent portion thereon. Such recording is further prevented by opening the switch FDR-2 at such time of silent tape portion formation.

The time duration during which the forward drive relay remains energized is selected in accordance with the presently preferred embodiment to be approximately 30 seconds. However, this time is not critical and any other interval 135 may be utilized. Only one important criteria exists for the selection of the time interval during which a silent portion is generated. This criteria is that the silent portion must be sufficiently long so as to be detectable during rapid rewind. Subject to that limitation, any other suitable time interval 135 may be used. As described above, the time interval 135 can be controlled by controlling the values of the resistor 94 and the capacitor 92.

When the capacitor 92 has discharged sufficiently so that the forward drive relay 90 again becomes deenergized, the switch FDR-1 again opens — this removing the potential −V from the forward drive means 34 and the tape 38 comes to a stop. At this time, the recording head 42 is positioned or interposed in the region of the beginning portion of the third message 104'. At this time, the answering machine is again in a stand-by mode for receiving and recording messages which may be telephones over the telephone lines to be recorded on the tape 100'. It is assumed that the third through the sixth messages 104'–107' are recorded prior to the user again transmitting a coded index tone over the telephone line 12 in order to play-back the sub-series of messages recorded in the time since the last play-back cycle.

As described above, in connection with the play-back messages 1 and 2, an index tone 122 is recorded for a time interval 115. When the capacitor 17 has charged sufficiently, the rewind relay 22 is again energized and the reverse drive means 30 is activated as a result of the closing of the switch RR-2.

Another important feature of the present invention, is the monitoring of the rewinding tape by the play amplifier 60. As long as message signals are detected by the no-signal detector 62, the no-signal relay 64 remains deenergized. Consequently, the tape continues to rewind. However, when the tape 100 has rewound sufficiently, so that the play head 42 detects a no-signal tape portion, i.e., when the play head 42 is disposed adjacent the silent portion 130, the no-signal detector 62 causes the no-signal relay 64 to become energized.

Upon the energization of the no-signal relay 64, the normally closed switch NSR-1 opens to thereby release the latched rewind relay 22. This action causes the switch RR-2 to reopen and the potential −V is removed from across the reverse drive means 30. Consequently, the rewind operation stops upon the sensing of the silent portion 130. Simultaneously, the energization of the no-signal relay 64 closes the normally open switch NSR-2. This places a potential −V across the play-back relay 66, the latter latching through the switch ITR-5 upon the closing of the switch PBR-1. Consequently, as soon as the silent portion 30 is detected, rewinding stops and play-back is resumed. It will be appreciated that the messages which are now played back to the user are only the messages contained in the latest sub-series and which consist of messages 3–6. The tape is not rewound to the beginning of the tape as with the prior art embodiments described in connection with FIG. 2, and the messages in a previous sub-series, namely messages 1 and 2, are not replayed each time a coding tone is transmitted by the user over the telephone lines. After the second sub-series, namely messages 3–6, have been played back, the kick-back relay 80, after the play-back relay 66 has been released as described above, will cause a retracing over the distance 115. Subsequently, the forward drive relay 90 will cause the forward drive means 34 to advance the tape 100' a distance 145 in a manner described above. When the tape 38 stops advancing at the end of the distance 145, the answering apparatus is again in a stand-by mode awaiting to receive a third sub-series of messages 7–8 and so on. In effect, the circuit of FIG. 1, limits rewind in each case to the latest sub-series of recorded messages. Prior sub-series are not rewound and thereby not played back.

It should be apparent from the above description, that the portions 135 and 145 between adjacent sub-series of message permits the stopping of the rewind at the beginning of the latest sub-series due to the presence of detectable information, such as silent portions 135, 145. It is clear, however, that any other detectable information or scheme may be utilized to accomplish the same result. Thus, specially coded signals or tones may be utilized to replace the silent portions 135, 145, and so on. However, depending on the nature of the mechanism used, the information must be detectable by a suitable detector means which may replace the no-signal detector 62. The no signal relay 64, or An equivalent thereof, is still to be utilized. For example, if a special high frequency tone is recorded at the end of each sub-series, an equivalent of the no-signal detector 62 must be capable of detecting this high frequency recorded tone during rewinding of the tape 38 so that a relay corresponding to no-signal relay 64 may open switch NSR-1 and close NSR-2. In all other respects, the principle of operation is identical. Another possible arrangement is the utilization of coded signals or tones may be utilized to replace the silent portions 135, 145, and so on. However, depending on the nature of the mechanism used, the information must be detectable by a suitable detector means which may replace the no-signal detector 62. The no signal relay 64, or an equivalent thereof, is still to be utilized. For example, if a special high frequency tone is recorded at the end of each sub-series, an equivalent of the no-signal detector 62 must be capable of detecting this high frequency recorded tone during rewinding of the tape 38 so that a relay corresponding to no-signal relay 64 may open switch NSR-1 and close NSR-2. In all other respects, the principle of operation is identical. Another possible arrangement is the utilization of a double track tape wherein a signal is recorded on a second track on the advanced portion of the tape. In this case, a play head may be provided to sense the signal on the second track during rewind to thereby energize an equivalent of a no-signal detector 62. Such an arrangement is advantageous for several reasons. Firstly, as described above, stray signals may always exist and be recorded on the tape. Secondly, it is possible for a person to initiate the answering machine by calling and not speaking into the machine. In the first case, a "silent portion" is not really silent, whereas in the second case, a message portion may appear to look to the machine as a silent portion. As to the first case, the opening of FDR-2 eliminates the recording of stray signals and noise which can be recorded on the silent portions. In the second case, a feature may be provided, conventional in the art, which automatically turns off the machine when a caller does not speak into it for a predetermined short time duration. In the latter case, the time duration is generally sufficiently short so that it is not detected upon rapid rewind. However, the use of a double track, as suggested above, may have the advantage in that it is more reliable since it no longer depends on silent portions for its operation but on affirmative or existent signals which may in many instances be more easily detected.

It should also be mentioned that although the invention has been described as used with a remotely transmitted coding tone over the telephone lines, it is clear that the telephone answering apparatus as shown in FIG. 1 may easily be modified to incorporate manually controllable means which serve the same function as the transmitted coding tone. With such a modified apparatus, it is also possible for a user to periodically, for example, come into an office and play-back that sub-series of messages recorded subsequent to a previous play-back earlier in the day without rewinding the entire tape and hearing the earlier messages numerous times.

The scope of the invention also includes other systems of remote coding (not using coding tones) and other systems for terminating the playback mode of the recorded messages. These other systems are not limited to index tone detection for terminating the playback mode. These alternate systems are all well known to those skilled in the state of the art.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. In a telephone answering apparatus coupled to telephone lines having recording means for recording a series of messages on a tape, rewind means for rewinding the tape, and play-back means for reproducing the series of messages subsequent to rewinding of at least a portion of the tape bearing the messages, the combination comprising advancing means for advancing the tape a predetermined distance starting substantially within the region of the trailing portion of the last message in the series; conditioning means for conditioning the advanced portion of the tape to be detected during rewinding of the tape; detecting means for detecting the conditioned portions of the tape during rewinding of the latter and for terminating further rewinding of the tape in response to detection of a conditioned portion of the tape; wherein the telephone apparatus recording index tones at the end of the last message of a series, and kick-back means for causing the tape to rewind an amount corresponding to the duration of the recorded index tone, wherein said advancing means cooperates with said kick-back means to commence advancement of the tape subsequent to kick-back.

2. In a telephone answering apparatus coupled to telephone lines having recording means for recording a series of message on a tape; rewind means for rewinding the tape, and play-back means for reproducing the series of messages subsequent to rewinding of at least a portion of the tape bearing the messages, the combination comprising advancing means for advancing the tape a predetermined distance starting substantially within the region of the trailing portion of the last message in the series, said advancing means including forward drive means for advancing the tape, and forward time delay means cooperating with the forward drive means for energizing the latter for a time period corresponding to said predetermined distance, the recording means including a recording amplifier for recording information on the tape, and wherein said forward time delay means cooperates with the recording amplifier to prevent the latter from recording any information on the tape during advancement of the tape; conditioning means for conditioning the advanced portion of the tape to be detected during rewinding of the tape; and detecting means for detecting the conditioned portions of the tape during rewinding of the latter and for terminating further rewinding of the tape in response to detection of a conditioned portion of the tape.

3. The combination as defined in claim 2, further comprising a normally closed switch means associated with said forward time delay means for disconnecting the telephone answering apparatus from the telephone lines during energization of said forward drive means.

4. In a telephone answering apparatus coupled to telephone lines having recording means for recording a series of messages on a tape, rewind means for rewinding the tape, and play-back means for reproducing the series of messages subsequent to rewinding of at least a portion of the tape bearing the messages, the combination comprising advancing means for advancing the tape a predetermined distance starting substantially within the region of the trailing portion of the last message in the series, said advancing means including forward drive means for advancing the tape, and forward time delay means cooperating with the forward drive means for energizing the latter for a time period corresponding to said predetermined distance, said time delay means comprising a relay coil, and energy storing timing means associated with said relay coil for energizing the latter for a predetermined time period corresponding to said predetermined distance; conditioning means for conditioning the advanced portion of the tape to be detected during rewinding of the tape; and detecting means for detecting the conditioned portions of the tape during rewinding of the latter and for terminating further rewinding of the tape in response to detection of a conditioned portion of the tape.

5. The combination as defined in claim 4, wherein said time delay means comprises a resistor-capacitor circuit.

6. The combination as defined in claim 4, wherein the time constant of said time delay means is selected to be in the range of approximately twenty to thirty seconds.

* * * * *